United States Patent [19]
Peters

[11] Patent Number: 4,712,426
[45] Date of Patent: Dec. 15, 1987

[54] SYNCHRONOUS FM DIGITAL DETECTOR
[75] Inventor: Rex B. Peters, Woodinville, Wash.
[73] Assignee: Sundstrand Data Control, Inc., Redmond, Wash.
[21] Appl. No.: 789,657
[22] Filed: Oct. 21, 1985
[51] Int. Cl.$^4$ ........................... G01P 9/04; G01P 15/10
[52] U.S. Cl. ........................................ 73/505; 73/510; 73/517 AV
[58] Field of Search ..................... 73/505, 510, 517 R, 73/517 AV; 329/107, 110, 126

[56]   References Cited
U.S. PATENT DOCUMENTS 3,842,681 10/1974 Mumme ................................. 73/505
4,386,535  6/1983 Albert .................................... 73/504
4,590,801  5/1986 Merhav ................................. 73/510

Primary Examiner—Stewart J. Levy
Assistant Examiner—John E. Chapman, Jr.
Attorney, Agent, or Firm—Christensen, O'Connor, Johnson & Kindness

[57]  ABSTRACT

A system for determining angular rate of rotation of a body about a rate axis. In one arrangement, the system comprises first (10) and second (12) accelerometers, movement apparatus and processor. The first and second accelerometers have their sensitive axes (16, 18) parallel to a sensing axis that is in turn perpendicular to the rate axis. The first and second accelerometers produce first and second output signals ($a_1$, $a_2$), each output signal having a frequency corresponding to the acceleration experienced by the respective accelerometer along its sensitive axis. The movement apparatus includes a generator (68) for producing a periodic movement signal and a mounting system (14) responsive to the movement signal for periodically moving the accelerometers along a movement axis perpendicular to the rate and sensing axes, such that each output signal includes a periodic Coriolis component. The processor includes a device (75) for producing a reference signal that defines one or more first time periods during which the Coriolis components have one polarity and one or more second time periods during which the Coriolis components have the opposite polarity. The first and second time periods together span one or more complete periods of the movement signal. The processor further comprises counters (71, 72) for determining, for each output signal, a phase value representing the difference between the phase change of the output signal during the first time periods and the phase change of the output signal during the second time periods. The processor further includes a microprocessor (80) for determining from the phase values a value representing the angular rate of rotation of the body about the rate axis. In a second arrangement, a single accelerometer is periodically moved along the movement axis.

9 Claims, 8 Drawing Figures

SYNCHRONOUS FM DIGITAL DETECTOR

TECHNICAL FIELD

The present invention relates to synchronous FM digital detectors. Such detectors are particularly suited for use in inertial navigation systems in connection with vibrating beam accelerometers for measuring angular rate.

BACKGROUND OF THE INVENTION

In one known type of inertial navigation system, angular rate of rotation about a given coordinate axis is measured by moving an analog accelerometer along an axis normal to the accelerometer's sensitive axis and normal to the axis about which rotation is to be measured. For example, consider a set of X, Y and Z coordinate axes fixed in a body whose rotation rate is to be measured and an accelerometer also fixed in the body and having its sensitive axis aligned along the Z axis. If the angular rotation vector of the body includes a component along the X axis, then periodic motion of the accelerometer along the Y axis will result in a periodic Coriolis acceleration acting in the Z direction that will be sensed by the accelerometer. The magnitude of the Coriolis acceleration is proportional to the rotation rate about the X axis. As a result, the output of the accelerometer (typically a current signal) includes a DC or slowly changing component that represents the linear acceleration of the body along the Z axis and a periodic component that represents the rotation of the body about the X axis. The accelerometer output can be processed, along with the outputs of accelerometers that have their sensitive axes in the X and Y directions and that are moved along the Z and X axes, respectively, to yield linear acceleration and angular rate about the X, Y and Z axes. Such signal processing is described in U.S. Pat. No. 4,445,376, and in U.S. Pat. No. 4,590,801.

In the past, inertial navigation systems of the type described above have employed accelerometers that produce an analog output signal, such as a current signal, having a magnitude proportional to the sensed acceleration. A second known type of accelerometer produces an output signal that has a frequency related to the sensed acceleration. An example of such a frequency output accelerometer is a vibrating beam accelerometer. In a vibrating beam accelerometer, a proof mass is supported by a flexure hinge or the like and by a vibrating beam force sensing element that extends along the accelerometer's sensitive axis. The force sensing element is coupled to a drive circuit that causes the force sensing element to vibrate at its resonant frequency. An acceleration along the sensitive axis causes the proof mass to exert a tension or compression force on the force sensing element. In a manner analogous to a vibrating string, a tension force on the force sensing element causes its resonant frequency to rise, while a compression force on the force sensing element causes its resonant frequency to decrease. The force sensing element can therefore be operated as a force-to-frequency converter that frequency modulates an acceleration signal onto a carrier signal, the carrier signal being the zero acceleration resonant frequency of the force sensing element.

One advantage of vibrating beam accelerometers is the fact that their output signals are inherently digital, and may therefore be conveniently integrated into a microprocessor based inertial navigation system. The use of vibrating beam accelerometers as angular rate sensors, however, requires that a technique be developed for processing the output signals so that accelerations resulting from Coriolis accelerations are separated from linear accelerations of the body in which the accelerometer is housed.

SUMMARY OF THE INVENTION

In one aspect, the present invention provides a synchronous FM digital detector for receiving an input signal comprising a carrier that is frequency modulated by a periodic information signal, and for producing an output signal indicative of the amplitude of the information signal. The detector comprises reference means and phase means. The reference means produces a reference signal that is operative to define one or more first time periods during which the information signal has one polarity, and one or more second time periods during which the information signal has the opposite polarity. The first and second time periods together span one or more complete periods of the information signal. The phase means determines the difference between the phase change of the input signal during the first time periods and the phase change of the input signal during the second time periods, to thereby determine the amplitude of the information signal. The phase means may comprise counter means operative to determine the difference between the cycles of the input signal that occur during the first time periods and the cycles of the input signal that occur during the second time periods.

In another aspect, the present invention provides a system for determining the angular rate of rotation of a body about a rate axis. The system comprises first and second accelerometers, movement means and processing means. The first and second accelerometers have their sensitive axes parallel to a sensing axis that in turn is perpendicular to the rate axis. The first and second accelerometers are adapted to produce respective first and second output signals, each output signal having a frequency corresponding to the acceleration experienced by the respective accelerometer along its sensitive axis. The movement means includes means for producing a periodic movement signal and means responsive to the movement signal for periodically moving the accelerometers along a movement axis perpendicular to the rate and sensing axes. The output signal of each accelerometer therefore includes a periodic Coriolis component. The processing means comprises means for producing a reference signal that is operative to define one or more first time periods during which the Coriolis components have one polarity, and one or more second time periods during which the Coriolis components have the opposite polarity. The first and second time periods together span one or more complete periods of the movement signal. The processing means further comprises means for determining, for each output signal, a phase value representing the difference between the phase change of the output signal during the first time periods and the phase change of the output signal during the second time periods, and means for determining from the phase values a value representing the angular rate of rotation of the body about the rate axis.

DETAILED DESCRIPTION

Figure 1:
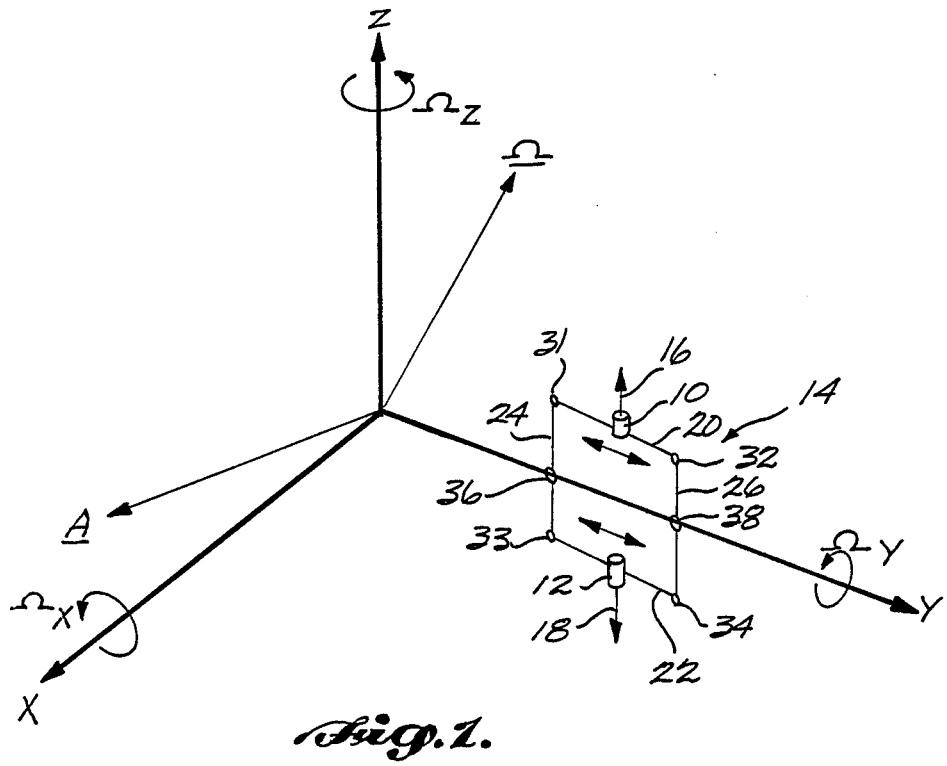
FIG. 1 is a partial schematic view of an inertial navigation system according to the present invention.

The principles of the invention are disclosed, by way of example, by the inertial navigation system schematically illustrated in FIG. 1. Coordinate axes X, Y and Z are fixed in the body whose linear acceleration and rotation rates are to be measured. The angular rotation rate of the body is defined by the vector $\Omega$, and the linear acceleration or specific force acting on the body is defined by vector A. In general, both $\Omega$ and A vary with time, and may be expressed as:

$$\Omega = \Omega_x i + \Omega_y j + \Omega_z k \quad (1)$$

$$A = A_x i + A_y j + A_z k \quad (2)$$

where i, j and k are unit vectors pointing along the X, Y and Z axes, respectively.

The inertial navigation system of FIG. 1 includes vibrating beam accelerometers 10 and 12 supported in mounting system 14. The accelerometers are mounted in a "back-to-back" configuration, with sensitive axis 16 of accelerometer 10 directed in a positive direction along the Z axis, and sensitive axis 18 of accelerometer 12 directed in a negative direction along the Z axis. Mounting system 14 is a parallelogram arrangement that includes support members 20 and 22 that are parallel to the Y axis and that are connected to a pair of linkage members 24 and 26 through pivots 31–34. Linkage members 24 and 26 are in turn mounted to a suitable support structure at central pivots 36 and 38. Support members 20 and 22 are connected to a suitable drive mechanism that periodically (e.g., sinusoidally) vibrates linkage members 24 and 26 about central pivots 36 and 38, thereby vibrating the support members and accelerometers along the Y axis. The vibratory motion of accelerometer 10 is 180° out-of-phase with the vibratory motion of accelerometer 12, e.g., when accelerometer 10 is moving in the positive Y direction, accelerometer 12 is moving at the same speed in the negative Y direction. A suitable apparatus for implementing the parallelogram structure shown in FIG. 1 is described in U.S. Pat. No. 4,510,802.

It is to be understood that the present invention is not limited to the back-to-back arrangement shown in FIG. 1, but instead is applicable to all arrangements in which one or more accelerometers are vibrated along an axis normal to the sensitive axis or rotated in a plane normal to the sensitive axis. A number of such arrangements are described in the above-referenced U.S. Pat. Nos. 4,445,376 4,590,801.

The periodic vibration of accelerometers 10 and 12 along the Y axis interacts with rotation rate of the body about the X axis to produce Coriolis forces acting along the Z direction. The output of each accelerometer 10 and 12 therefore includes a component $A_z$ resulting from linear acceleration of the body along the Z axis, and a second component proportional to a rotation rate $\Omega_x$. Separation of the linear acceleration signal from the Coriolis signal is described below. In a typical inertial navigation system, similar pairs of accelerometers would be mounted with their sensitive axes in the X and Y directions, and would be vibrated along the Z and X directions, respectively.

Figure 2:
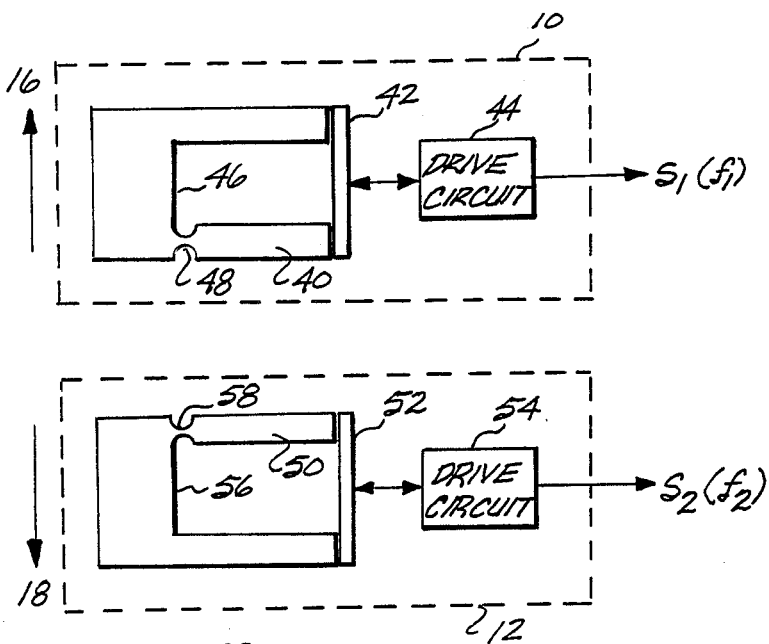
FIG. 2 is a schematic view of two vibrating beam accelerometers having their sensitive axes antiparallel to one another.

Referring now to FIG. 2, accelerometer 10 may comprise a conventional vibrating beam accelerometer that includes proof mass 40, force sensing element 42, drive circuit 44 and support 46. The force sensing element preferably comprises a quartz crystal having a double-ended tuning fork construction, as illustrated in U.S. Pat. No. 4,215,570. Drive circuit 44 causes the force sensing element to vibrate at a particular resonant frequency $f_1$, and the output of drive circuit 44 is a signal $S_1$ at such frequency. Proof mass 40 is mounted to support 46 by flexure hinge 48, the flexure hinge permitting motion of the proof mass about an axis that passes through the flexure hinge and that is perpendicular to the plane of the drawing in FIG. 2. Force sensing element 42 is aligned parallel to the Z axis, and has one end attached to support 46 and a second end attached to proof mass 40. The proof mass is thereby suspended at one end by the flexure hinge and at its other end by the force sensing element.

Accelerometer 12 is essentially a mirror image accelerometer 10, and includes proof mass 50, force sensing element 52, drive circuit 54, support 56, and flexure hinge 58. Drive circuit 54 causes force sensing element 52 to vibrate at a particular resonant frequency $f_2$, and produces an output signal $S_2$ at such frequency. An acceleration along the Z axis causes each proof mass to exert a tension or compression force on its respective force sensing element that causes the resonant frequency of the force sensing element to increase or decrease. Each force sensing element therefore operates as a force-to-frequency converter that frequency modulates an acceleration signal onto a carrier signal, the carrier signal being the zero acceleration resonant frequency of the force sensing element. In the arrangement shown in FIG. 2, the force sensing axis of the accelerometers are antiparallel, i.e., directed in opposite directions from one another, and a given acceleration along the Z axis will result in a compression force on one force sensing element and a tension force on the other force sensing element. The frequencies $f_1$ and $f_2$ will therefore change in opposite directions in response to a given linear acceleration along the Z axis.

Referring again to FIG. 1, assume that accelerometers 10 and 12 are each sinusoidally vibrated along the Y axis with amplitude $\rho$ and angular frequency $\omega$. The total acceleration $a_1$ sensed by accelerometer 10 is given by:

$$a_1 = A_z + 2\rho\Omega_x\omega \cos \omega t \quad (3)$$

where $A_z$ is the linear acceleration along the Z axis, and where the second term represents the Coriolis acceleration experienced by accelerometer 10 as a result or rotation about the X axis at angular rate $\Omega_x$ and vibration along the Y axis with amplitude $\rho$ and angular frequency $\omega$. It is assumed in Equation (3) that the motion of accelerometer 10 along the Y axis is synchronous with $\sin \omega t$, i.e., the accelerometer is at its vibrational midpoint at t=0. The Coriolis acceleration is proportional to velocity, and therefore to cos ωt. The acceleration sensed by accelerometer 12 will be:

$$a_2 = -A_z + 2\rho\Omega_x\omega \cos \omega t \quad (4)$$

The linear acceleration terms in Equations (3) and (4) have opposite signs due to the opposite directions of sensitive axes 16 and 18. The Coriolis terms for accelerometers 10 and 12 have the same sign because both the sensitive axes and vibrational motion of the accelerometers are both opposite to one another, thereby producing Coriolis accelerations in the same direction relative to the respective sensitive axes.

The operation of each accelerometer as a force-to-frequency converter can be expressed as:

$$f_1 = f_{01} + k_{11}(a_1 + k_{21}a_1^2) \quad (5)$$

$$f_2 = f_{02} + k_{12}(a_2 + k_{22}a_2^2) \quad (6)$$

where $f_{01}$ and $f_{02}$ are the zero load frequencies of accelerometer output signals $S_1$ and $S_2$, respectively, and wherein $k_{11}$, $k_{12}$, $k_{21}$, and $k_{22}$ are constants. Combining Equations (3) and (4) with Equations (5) and (6), one obtains:

$$f_1 = f_{01} + k_{11}(A_z + 2\Omega_x\rho\omega\cos\omega t) + \quad (7)$$
$$k_{11}k_{21}(A_z^2 + 4A_z\Omega_x\rho\omega\cos\omega t + 4\Omega_x^2\rho^2\omega^2\cos^2\omega t)$$

$$f_2 = f_{02} + k_{12}(-A_z + 2\Omega_x\rho\omega\cos\omega t) + \quad (8)$$
$$k_{12}k_{22}(A_z^2 - 4A_z\Omega_x\rho\omega\cos\omega t + 4\Omega_x^2\rho^2\omega^2\cos^2\omega t)$$

Equations (7) and (8) may be converted to a more useful form by defining the following four integrals:

$$I_{11} = \int_{t_1}^{t_2} (f_1 + f_2)dt \quad (9)$$

$$I_{12} = \int_{t_2}^{t_3} (f_1 + f_2)dt \quad (10)$$

$$I_{21} = \int_{t_1}^{t_2} (f_1 - f_2)dt \quad (11)$$

$$I_{22} = \int_{t_2}^{t_3} (f_1 - f_2)dt \quad (12)$$

Figure 3:
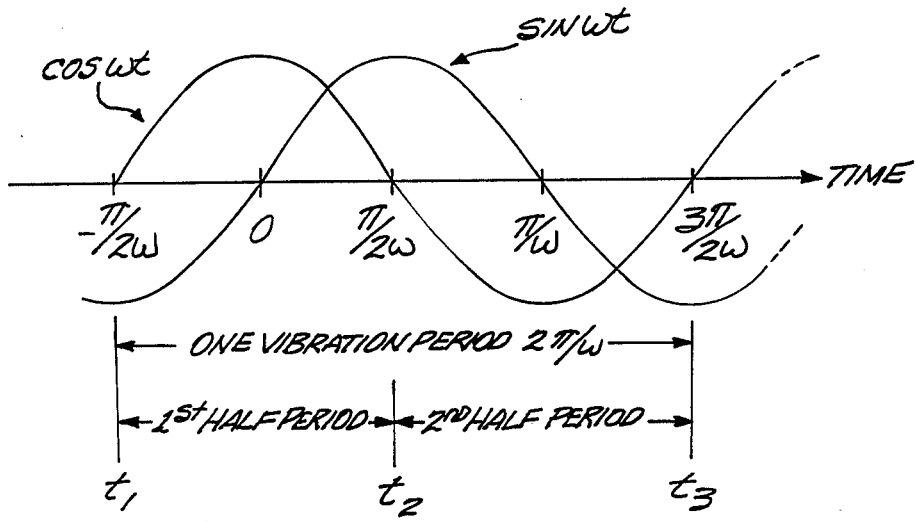
FIG. 3 is a graph illustrating selection of the first and second half periods of the vibration period.

The times $t_1$, $t_2$ and $t_3$ may be selected in a manner illustrated in FIG. 3. In FIG. 3, the functions sin ωt and cos ωt are shown as a function of time over one vibration period $2\pi/\omega$. As indicated, the time interval $t_1$ through $t_3$ spans the complete vibration period, the time interval $t_1$ through $t_2$ spans the one-half of the vibration period in which the function cos ωt has one polarity (e.g., positive), and the time interval $t_2$ through $t_3$ spans the other one-half of the vibration period in which the function cos ωt has the opposite polarity. Thus in this example, specific values for the times $t_1$, $t_2$ and $t_3$ are $-\pi/2\omega$, $+\pi/2\omega$ and $3\pi/2\omega$, respectively. It will be appreciated that other integrals and time limits may be used with equal effect, so long as one integral or set of integrals covers the half of one or more complete vibration periods in which the function cos ωt has one polarity, while a second integral or set of integrals covers the other half of such vibration period or periods in which cos ωt has the opposite polarity.

By combining Equations (7)-(12), one obtains:

$$I_{11} = A_1 + B_1A_z + C_1A_z^2 + D_1\Omega_x + E_1A_z\Omega_x + G_1\Omega_x^2 \quad (13)$$

$$I_{12} = A_1 + B_1A_z + C_1A_z^2 - D_1\Omega_x - E_1A_z\Omega_x + G_1\Omega_x^2 \quad (14)$$

$$I_{21} = A_2 + B_2A_z + C_2A_z^2 + D_2\Omega_x + E_2A_z\Omega_x + G_2\Omega_x^2 \quad (15)$$

$$I_{22} = A_2 + B_2A_z + C_2A_z^2 - D_2\Omega_x - E_2A_z\Omega_x + G_2\Omega_x^2 \quad (16)$$

in which $$A_1 = \frac{\pi}{\omega}(f_{01} + f_{02}) \quad (17)$$

$$A_2 = \frac{\pi}{\omega}(f_{01} - f_{02}) \quad (18)$$

$$B_1 = \frac{\pi}{\omega}(k_{11} - k_{12}) \quad (19)$$

$$B_2 = \frac{\pi}{\omega}(k_{11} + k_{12}) \quad (20)$$

$$C_1 = \frac{\pi}{\omega}(k_{11}k_{21} + k_{12}k_{22}) \quad (21)$$

$$C_2 = \frac{\pi}{\omega}(k_{11}k_{21} - k_{12}k_{22}) \quad (22)$$

$$D_1 = 4\rho(k_{11} + k_{12}) \quad (23)$$

$$D_2 = 4\rho(k_{11} - k_{12}) \quad (24)$$

$$E_1 = 8\rho(k_{11}k_{21} - k_{12}k_{22}) \quad (25)$$

$$E_2 = 8\rho(k_{11}k_{21} + k_{12}k_{22}) \quad (26)$$

$$G_1 = 2\rho^2\pi\omega(k_{11}k_{21} + k_{12}k_{22}) \quad (27)$$

$$G_2 = 2\rho^2\pi\omega(k_{11}k_{21} - k_{12}k_{22}) \quad (28)$$

By combining Equations (9)-(12) and (13)-(16), one obtains:

$$I_{11} - I_{12} = 2D_1\Omega_x + 2E_1A_z\Omega_x \quad (29)$$

$$I_{21} - I_{22} = 2D_2\Omega_x + 2E_2A_z\Omega_x \quad (30)$$

which can be combined to produce:

$$\Omega_x = \frac{(I_{11} - I_{12}) - (I_{21} - I_{22})\frac{E_1}{E_2}}{2D_1\left(1 - \frac{D_2E_1}{D_1E_2}\right)} \quad (31)$$

The angular rate $\Omega_x$ may be converted to an angular change about the X axis $\Delta\theta_x$ over one vibration period as follows:

$$\Delta\theta_x = \Omega_x \cdot \frac{2\pi}{\omega} \quad (32)$$

From Equations (9) and (10), the integral expressions $I_{11} - I_{12}$ and $I_{21} - I_{22}$ in Equation (31) are:

$$I_{11} - I_{12} = \left[\int_{t_1}^{t_2} f_1 dt - \int_{t_2}^{t_3} f_1 dt\right] + \quad (33)$$

$$I_{21} - I_{22} = \left[\int_{t_1}^{t_2} f_1 dt - \int_{t_2}^{t_3} f_1 dt\right] - \left[\int_{t_1}^{t_2} f_2 dt - \int_{t_2}^{t_3} f_2 dt\right]. \quad (34)$$

The integral of the frequency of a signal over a predetermined time period is equal to the phase change of the signal over such time period. The first bracketed term in Equation (33) can therefore be seen to be equal to the phase change of signal $S_1$ over one-half of a vibration period minus the phase change of the same signal over the second half of the vibration period. The second bracketed term in Equation (33) is a similar expression for signal $S_2$. The same two bracketed terms appear in Equation (34), except that in Equation (34) the bracketed term for $f_2$ is subtracted from the bracketed term for $f_1$.

Figure 4:
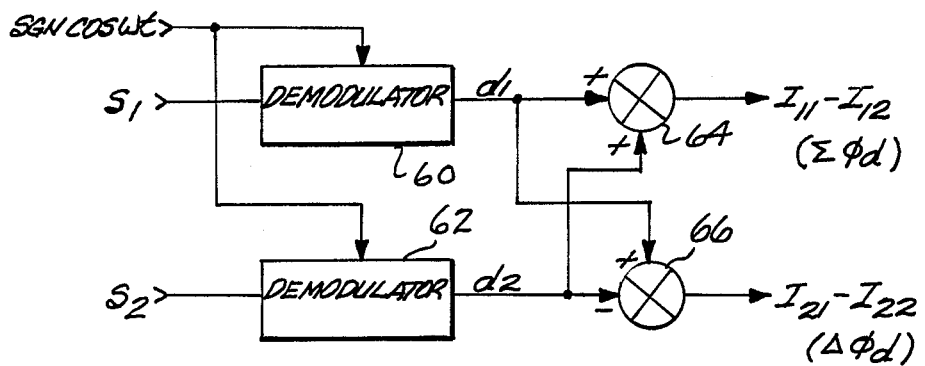
FIG. 4 is a conceptual view illustrating the demodulation of the output signals and the combination of the demodulated signals to produce $\Delta\phi$ and $\Sigma\phi$.

Determination of the quantities $(I_{11}-I_{12})$ and $(I_{21}-I_{22})$ is conceptually illustrated in FIG. 4. Given the definition of times $t_1$, $t_2$ and $t_3$, each bracketed term in Equations (33) and (34) corresponds to the respective function $f_1$ or $f_2$ demodulated by the function SGN cos $\omega t$, where SGN represents "sign of". In FIG. 4, signals $S_1$ and $S_2$ are shown being demodulated with the function SGN cos $\omega t$ by demodulators 60 and 62, respectively. The resultant demodulated signals $d_1$ and $d_2$ correspond to the bracketed expressions in Equations (33) and (34), and these signals are input to summing junctions 64 and 66. Summing junction 64 adds signals $d_1$ and $d_2$ to produce the quantity $I_{11}-I_{12}$ of Equation (33), and summing junction 66 subtracts the signals $d_1$ and $d_2$ to produce the quantity $I_{21}-I_{22}$ of Equation (34). The quantity $I_{11}-I_{12}$ is equal to the sum of the phase changes of the demodulated signals $d_1$ and $d_2$ over one vibration period, and can therefore be designated as a phase change sum $\Sigma\phi_d$, where the subscript d indicates that the phase refers to the phases of the demodulated signals $d_1$ and $d_2$. The quantity $I_{21}-I_{22}$ can be designated as a phase change difference $\Delta\phi_d$, where again the subscript d indicates that the phases are those of the demodulated signals $d_1$ and $d_2$. It is therefore possible to rewrite Equation (32) as:

$$\Delta\theta_x = a[\Sigma\phi_d + b\Delta\phi_d] \quad (35)$$

where $\Sigma\phi_d$ and $\Delta\phi_d$ are as defined above, and a and b are constants.

A derivation similar to that set forth above may be used to determine linear acceleration $A_z$ and velocity change $\Delta V_z$ during one vibration period as follows:

$$\Delta V_z = \frac{2\pi}{\omega} \cdot A_z = \quad (36)$$

$$\frac{2\pi}{\omega} \cdot \frac{(I_{21} + I_{22} - 2A_2) - (I_{11} + I_{12} 2A_1)\frac{C_2}{C_1}}{2B_2\left(1 - \frac{B_1 C_2}{B_2 C_1}\right)}$$

where the integral expressions $I_{11}+I_{12}$ and $I_{21}+I_{22}$ are as follows:

$$I_{11} + I_{12} = \int_{t_1}^{t_3} f_1 dt + \int_{t_1}^{t_3} f_2 dt \quad (37)$$

$$I_{21} + I_{22} = \int_{t_1}^{t_3} f_1 dt + \int_{t_1}^{t_3} f_2 dt \quad (38)$$

Each integral in Equations (37) and (38) is the phase change of one of the accelerometer output signals $S_1$ or $S_2$ over a full vibration period. The expression $I_{11}+I_{12}$ therefore represents the sum of the phase changes of the output signals over a vibration period, while the expression $I_{21}+I_{22}$ represents the difference in the phase changes of the output signals over one vibration period. Designating the phase difference and phase sum by $\Delta\phi$ and $\Sigma\phi$ respectively, Equation (36) may be rewritten as:

$$\Delta V_z = A[\Delta\phi + FT + B\Sigma\phi] \quad (39)$$

where $\Delta\phi$ and $\Sigma\phi$ here refer to the output signals $S_1$ and $S_2$ themselves rather than to the demodulated output signals $d_1$ and $d_2$, where T is one vibration period, and where A, F and B are constants. Equation (39) has application beyond angular rate sensors, and is usable with any frequency output accelerometers arranged in a push-pull configuration, as described in U.S. patent application, Ser. No. 789,752, filed concurrently herewith, inventor Rex B. Peters, entitled "Accelerometer With Velocity Change Output".

Figure 5:
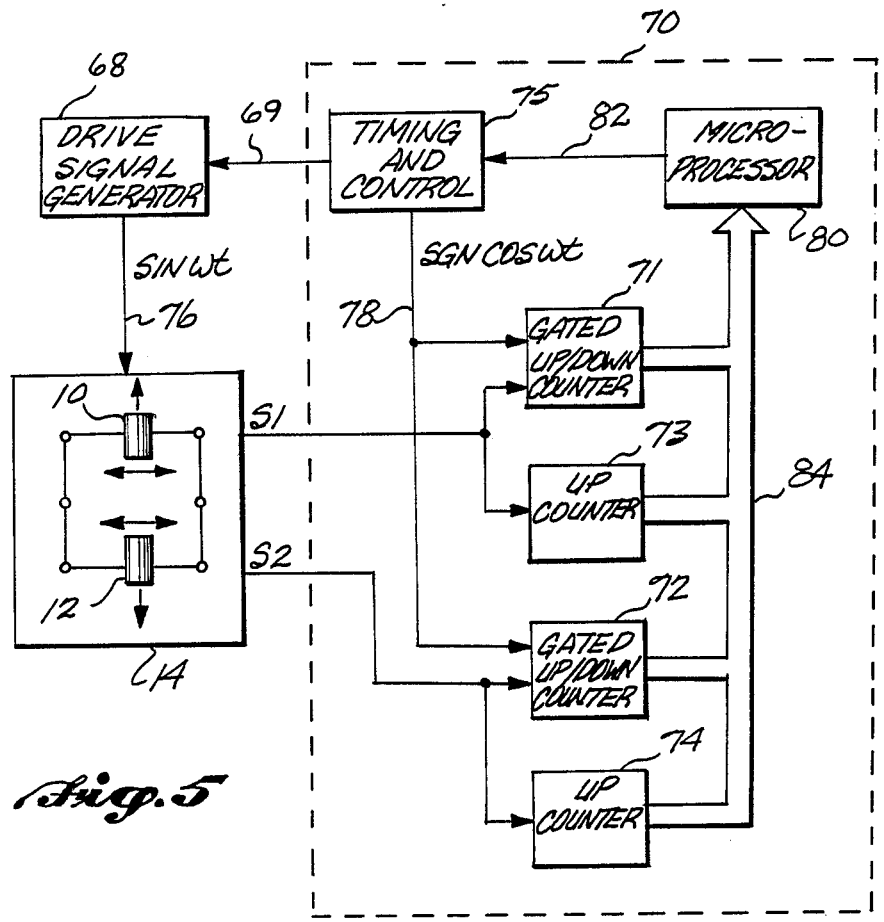
FIG. 5 is a block diagram of a system for determining the angular rate from the accelerometer output signals.

Equations (31) through (39) may be implemented by the system illustrated in FIG. 5. The system includes drive signal generator 68 and data processor 70, data processor 70 comprising timing and control circuit 75, gated up/down counters 71 and 72, up counters 73 and 74, and microprocessor 80. Timing and control circuit 75 generates timing signals on line 69 that serve to define the vibration period $2\pi/\omega$, the timing signals being derived from a clock within microprocessor 80 via line 82. Such timing signals are received by drive signal generator 68, and used by the drive signal generator to produce a sinusoidal drive signal sin $\omega t$ on line 76. The drive signal on line 76 is received by accelerometer assembly 14 that includes accelerometers 10 and 12, and causes the accelerometers to sinusoidally vibrate along the Y axis with an angular frequency $\omega$ and amplitude $\rho$. Suitable means for converting the drive signal sin $\omega t$ into vibrational movement of accelerometers 10 and 12 are described in the above-referenced U.S. Pat. No. 4,510,802.

The accelerometer output signals $S_1$ and $S_2$ have frequencies $f_1$ and $f_2$ respectively that correspond to the total accelerations experienced by each accelerometer. Up counter 73 counts cycles of signal $S_1$ from accelerometer 10. Each cycle corresponds to a phase change of $2\pi$ in the $S_1$ signal. The count accumulated by up counter 73 during one vibration period $2\pi/\omega$ (or during a period comprising a plurality of complete vibration periods) will therefore correspond to the total phase change of signal $S_1$ over such period. Since phase change is the integral of frequency over time, the count stored in up counter 73 corresponds to the first integral in Equations (37) and (38).

Gated up/down counter 71 receives signal $S_1$, as well as a gate signal from timing and control circuit 75 via line 78. The gate signal may be any signal representing the function SGN cos $\omega t$. For example, the gate signal could be positive during a first half cycle from $t_1$ to $t_2$ ($-\pi/2\omega$ to $\pi/2\omega$), and negative during a second half cycle from $t_2$ to $t_3$ ($\pi/2\omega$ to $3\pi/2\omega$). Gated up/down counter 71 responds to the gate signal by counting the cycles of signal $S_1$ in one direction (e.g., up) during the first half cycle and in the opposite direction (e.g., down) during the succeeding half cycle. The count stored by gated up/down counter 71 therefore corresponds to the first bracketed term in Equations (33) and (34). Up counter 74 counts cycles of signal $S_2$ from accelerometer 12, and the count accumulated by up counter 74 during one vibration period corresponds to the total phase change of signal $S_2$ over such period. The count stored by up counter 74 therefore corresponds to the second integrals in Equations (37) and (38). Gated up/down counter 74 receives signal $S_2$ as well as the gate signal on line 78. Gated up/down counter 72 counts cycles of signal $S_2$ alternately up and down during successive half cycles of the vibration period. The count stored by gated up/down counter 72 therefore corresponds to the second bracketed term in Equations (33) and (34). The output of these counters are input to microprocessor 80 via bus 84, and the microprocessor periodically determines the accumulated counts and determines angular change $\Delta\phi_x$ and velocity change $\Delta V_z$ as per Equations (35) and (39).

If counters 73 and 74 are allowed to accumulate counts indefinitely, the possibility of overflow arises. This problem can be avoided by having the counters reset periodically as their accumulated counts are transferred to microprocessor 80. The accumulated counts from counters 73 and 74 are then used by the microprocessor to determine $\Delta\phi$ and $\Sigma\phi$ of Equation (39). Although the quantity $\Sigma\phi$ would in principle be subject to overflow within microprocessor 80, such overflow may be prevented by periodically calculating and storing the quantity $FT + B\Sigma\phi$. This latter quantity is inherently limited in magnitude, since it represents a linearity correction to the velocity change represented by $A\Delta\phi$.

It should be understood that techniques other than the up/down counters shown in FIG. 5 could be employed to perform the demodulation function represented by demodulators 60 and 62 of FIG. 4. For example, microprocessor 80 could sample the contents of up counters 71 and 73 at least twice during each vibration period, and subtract the count of the second sample in each period from the count of the first sample in that period. In this case, the reference signal representing SGN cos $\omega t$ is internal to the microprocessor, and is used by the microprocessor to determine the sampling times.

There are many applications where the system shown in FIG. 5 would be suitable, not only to demodulate a Coriolis signal from a linear acceleration signal, but wherever an FM signal contains information that is modulated synchronously (i.e., in phase) with respect to a reference signal whose frequency is much lower than the FM carrier. However, for certain applications, the system shown in FIG. 5 has a limited resolution, which may be seen by noting that for a typical inertial navigation system, the vibration frequency may be 100 Hz and the frequencies $f_1$ and $f_2$ may be on the order of 40 kHz. Thus there are only about 400 cycles of signals $S_1$ and $S_2$ in one vibration period. If full scale corresponds to a 10% frequency shift in signals $S_1$ and $S_2$, then the pulse difference over one vibration period cannot be more than about 6% of 400 cycles, or 24 cycles. Thus, over a single vibration period, a one cycle differential indicates a rate of 4% full scale. Assuming that signals $S_1$ and $S_2$ are not synchronous with the vibration period, this resolution can be improved by accumulating counts over sufficiently large time periods. However, if full scale for the rotation rate is 200° per second, then a rotation rate of 1° per hour will require over 1000 vibration periods for one net pulse, i.e., one net count in the gated up/down counters. If the vibration frequency is 100 cycles per second, the time period required to measure to an accuracy of 1° per hour is therefore about 30 seconds.

Figure 6:
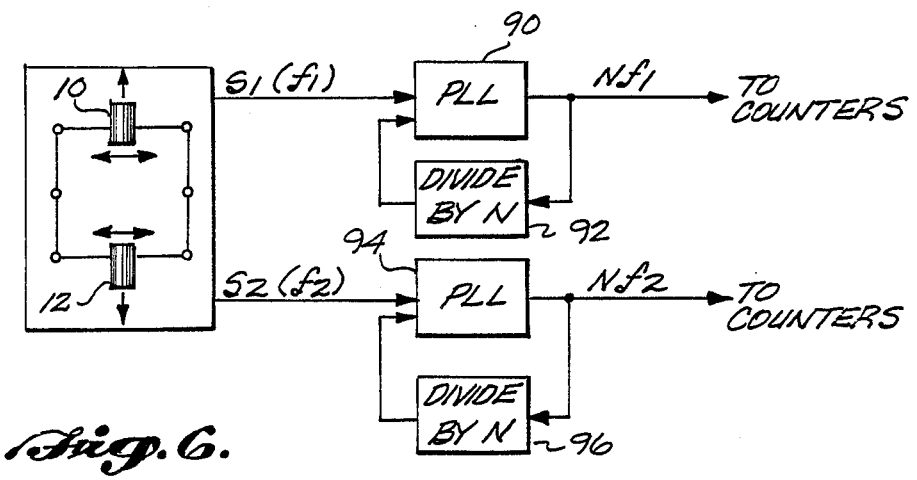
FIG. 6 illustrates means for increasing the frequencies of the output signals; and, FIGS. 7A and 7B illustrate an interpolation technique for measuring fractional periods of the output signals.

The source of the resolution problem is that the system shown in FIG. 5 only measures phase change in increments of $2\pi$. One hardware based technique to improve the resolution is to increase the frequencies of signals $S_1$ and $S_2$ using phase lock loops, as indicated in FIG. 6. Phase lock loop 90 receives signal $S_1$, and the output of the phase lock loop is passed through a divide by N circuit 92 and then fed back to the voltage control oscillator input of the phase lock loop. The output signal from phase lock loop 90 will thus be a signal having a frequency $N f_1$ for an input frequency of $f_1$. In a similar manner, phase lock loop 94 and divide by N circuit 96 are used to convert signal $S_2$ to a signal having a frequency of $N f_2$. This technique will in general increase the accuracy of the phase determinations by a factor of N. Stability requires that the corner frequency of the voltage control oscillator servo system be much less than the input frequencies $f_1$ and $f_2$, while accuracy requires that it be greater than the vibration frequency $\omega$. Since these two frequencies typically differ by a factor of 400, these conditions in general will be easily met.

Figure 7A:
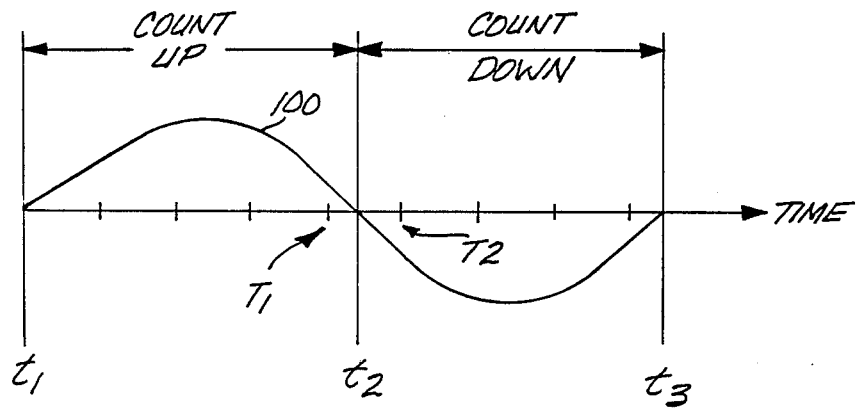
Figure 7B:
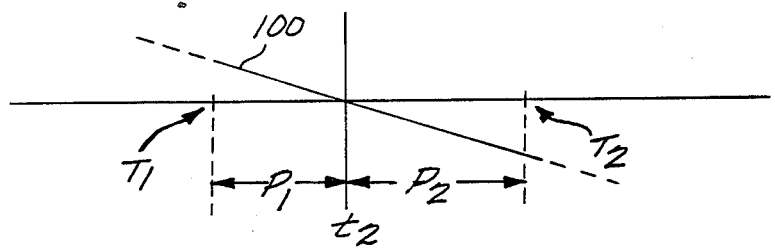

A software based approach to increasing resolution is schematically illustrated in FIGS. 7A and 7B. In FIG. 7A, curve 100 represents the vibration velocity of accelerometers 10 and 12, i.e., the cos $\omega t$ Coriolis acceleration terms in Equations (3) and (4). FIG. 7A illustrates one vibration period extending from time $t_1$ to time $t_3$. As described above, gated up/down counters 71 and 72 are adapted to count up during one-half of the vibration period, for example from time $t_1$ to time $t_2$, and then to count down for the subsequent half of the vibration period from time $t_2$ to time $t_3$. The marks along the time axis in FIG. 7A represent full cycles of one of the output signals (e.g., signal $S_1$), the frequency $f_1$ of such output signal with respect to the vibration frequency $\omega$ being decreased for ease of illustration. Ideally, the times $t_1$, $t_2$ and $t_3$ would each correspond to the end of an $S_1$ cycle. If such were the case, then there would be no loss of resolution in counting only full cycles of the $S_1$ signal. However, the frequencies $f_1$ and $f_2$ of signals $S_1$ and $S_2$ are in general continuously varying, and therefore cannot be made synchronous with the vibration frequency. As illustrated in FIG. 7A, the result is that the first half of a vibration period will end between two full cycles of the $S_1$ signal, e.g., between times $T_1$ and $T_2$, as illustrated in the expanded view of FIG. 7B. The problem can be viewed as one of determining the fraction of the $S_1$ cycle that occurs during time period $P_1$ from time $T_1$ to the end of the first half of the vibration period at time $t_2$, and the corresponding fraction of the $S_1$ cycle that occurs during time period $P_2$ from time $t_2$ to time $T_2$. Since the fraction of a vibration period occupied by one cycle of signals $S_1$ (or $S_2$) is comparatively small, the phase change during such output signal period can be considered a linear function of time, to an excellent approximation. The fractions of a cycle that occur during time periods $P_1$ and $P_2$ can therefore be established by linear interpolation using a high-frequency clock as a reference. Such a high-frequency clock would measure time periods $P_1$ and $P_2$, and add the resulting fractional counts to the integer number of counts accumulated in the corresponding counters. The improvement in resolution is the ratio of the clock frequency to the frequency of signals $S_1$ and $S_2$. For output signal frequencies in the range of 40 kHz, a 6 MHz clock will therefore produce a resolution improvement of approximately 150 to 1.

The technique described above for separating a Coriolis signal from a linear acceleration signal can be applied to the case wherein only a single accelerometer is vibrated along a given axis. For such a system, derivation similar to that outlined above for the dual accelerometer case results in the following expression for $\Omega_x$:

$$\Omega_x = \frac{1}{8\rho k_1(1 + 2k_2 A_z)} \left[ \int_{t_1}^{t_2} f dt - \int_{t_2}^{t_3} f dt \right] \quad (40)$$

where f represents the frequency of the single accelerometer output signal, and where $k_1$ and $k_2$ correspond to $k_{11}$ and $k_{21}$ of Equation (5) above. In this implementation, the angular rate $\Omega_x$ can be extracted from the accelerometer output alone only if $k_2$ is very small compared to linear acceleration term $A_z$. However, if $A_z$ were available, such as from a nonvibrating accelerometer, an Equation (39) above could be used to determine angular rate. Suitable techniques for vibrating a single accelerometer along a vibration axis are described in above-referenced U.S. Pat. No. 4,509,801.

If Equations (3) and (4) are amended to include a term proportional to sin $\omega t$, in addition to the Coriolis term $2\rho\Omega_x\omega$ cos $\omega t$, the result in Equation (31) is unaltered. This shows that the technique described herein is not affected by error terms related to sin $\omega t$, such as those described in U.S. Pat. No. 4,445,376. In particular, the technique can be used to separate a periodic information signal that is in phase with a reference signal, not only from a signal that is constant over one integration cycle, but also from another periodic signal that is in quadrature phase with respect to the information signal. Conversely, the quadrature signal alone can be demodulated merely by shifting the reference signal one-quarter cycle with respect to the information signal. This capability provides a means for accomplishing the phase and alignment calibration function described in U.S. Pat. No. 4,510,802, as well as the automatic nulling function described in U.S. patent application, Ser. No. 789,655, filed concurrently herewith, inventor Rex B. Peters, entitled "Automatic Continuous Nulling of Angular Rate Sensor".

While the preferred embodiments of the invention have been illustrated and described, it should be understood that variations will be apparent to those skilled in the art. Accordingly, the invention is not to be limited to the specific embodiments illustrated and described, and the true scope and spirit of the invention are to be determined by reference to the following claims.

The embodiments of the invention in which an exclusive property or privilege is claimed are defined as follows:

1. A system for determining the angular rate of rotation of a body about a rate axis, the system comprising:
   first and second accelerometers having their sensitive axes parallel to a sensing axis perpendicular to the rate axis, the first and second accelerometers being adapted to produce respective first and second output signals, each output signal having a frequency corresponding to the acceleration experienced by the respective accelerometer along its sensitive axis;
   movement means including means for producing a periodic movement signal and means responsive to the movement signal for periodically moving the accelerometers along a movement axis perpendicular to the rate and sensing axes, whereby each output signal includes a periodic Coriolis component; and
   processing means comprising means for producing a reference signal that is operative to define one or more first time periods during which the Coriolis components have one polarity and one or more second time periods during which the Coriolis components have the opposite polarity, the first and second time periods together comprising one or more complete periods of the movement signal, means for determining, for each output signal, a phase value representing the difference between the phase change of the output signal during the first time periods and the phase change of the output signal during the second time periods, means for adding the phase values to one another to determine a phase sum value and for subtracting the phase values from one another to determine a phase difference value, and means for linearly combining the phase sum and phase difference values to determine a value representing the angular rate of rotation of the body about the rate axis.

2. The system of claim 1, wherein the means for determining the phase values comprises first and second counter means connected to receive the first and second output signals respectively, each counter means being operative to determine the difference between the cycles of the respective output signal that occur during the first time periods and the cycles of the respective output signal that occur during the second time periods.

3. The system of claim 1, wherein the means for determining the phase values comprises counter means for counting cycles of each output signal and data processing means for obtaining samples of the contents of the counter means at least twice during said one movement period and for algebraically combining the samples to determine the phase values.

4. The system of claim 1, wherein the processing means comprises frequency multiplication means for multiplying the frequency of each output signal by a predetermined number to thereby improve the resolution of the determination of phase values.

5. A system for determining the angular rate of rotation of a body about a rate axis, the system comprising:
   one or more accelerometers having their sensitive axes parallel to a sensing axis perpendicular to the rate axis, each accelerometer including means for producing an output signal having a frequency corresponding to the acceleration experienced by the accelerometer along its sensitive axis;

movement means including means for producing a periodic movement signal and means responsive to the movement signal for periodically moving the accelerometers along a movement axis perpendicular to the rate and sensing axes, whereby each output signal includes a periodic Coriolis component; and processing means comprising means for producing a reference signal that is operative to define one or more first time periods during which the Coriolis components have one polarity and one or more second time periods during which the Coriolis components have the opposite polarity, the first and second time periods together comprising one or more complete periods of the movement signal, means for determining, for each output signal, a phase value representing the difference between the phase change of the output signal during the first time periods and the phase change of the output signal during the second time periods, means for generating a high frequency clock signal, counter means for counting cycles of the clock signal during fractions of a cycle of an output signal which overlaps the first and second time periods, to thereby improve the resolution of the determination of phase values, and means for determining from the phase values a value representing the angular rate of rotation of the body about the rate axis.

6. A system for determining the angular rate of rotation of a body about a rate axis, the system comprising:

first and second accelerometers having their sensitive axes parallel to a sensing axis perpendicular to the rate axis, each accelerometer including means for producing an output signal having a frequency corresponding to the acceleration experienced by the accelerometer along its sensitive axis;

movement means including a parallelogram mechanism including a first support member secured to the first accelerometer, a second support member secured to the second accelerometer, a linkage mechanism attached to the first and second support members and secured to the body such that the first and second support members are parallel to the movement axis and such that the sensitive axes of the first and second accelerometers are parallel to the sensing axis, means for producing a sinusoidal movement signal and means responsive to the movement signal for vibrating the parallelogram mechanism such that the accelerometers are sinusoidally vibrated along a movement axis perpendicular to the rate and sensing axes, whereby each output signal includes a sinusoidal Coriolis component; and processing means comprising means for producing a reference signal that is operative to define one or more first time periods during which the Coriolis components have one polarity and one or more second time periods during which the Coriolis components have the opposite polarity, the first and second time periods together comprising one or more complete periods of the movement signal, means for determining, for each output signal, a phase value representing the difference between the phase change of the output signal during the first time periods and the phase change of the output signal during the second time periods, means for adding the phase values to one another to determine a phase sum value and for subtracting the phase values from one another to determine a phase difference value, and means for linearly combining the phase sum and phase difference values to determine a value representing the angular rate of rotation of the body about the rate axis.

7. The system of claim 6, wherein the sensitive axes of the first and second accelerometers are oriented in opposite directions from one another.

8. The system of claim 7, wherein the processing means includes means for adding the phase values to one another to determine a phase sum value and for subtracting the phase values from one another to determine a phase difference value, and means for linearly combining the phase sum and phase difference value to determine said value representing angular rate.

9. A system for determining the angular rate of rotation of a body about a rate axis and the linear acceleration of the body along a sensing axis perpendicular to the rate axis, the system comprising:

first and second accelerometers having their sensitive axes parallel to the sensing axis, the first and second accelerometers being adapted to produce respective first and second output signals, each output signal having a frequency corresponding to the acceleration experienced by the respective accelerometer along its sensitive axis;

movement means including means for producing a periodic movement signal and means responsive to the movement signal for periodically moving the accelerometers along a movement axis perpendicular to the rate and sensing axes, whereby each output signal includes a periodic Coriolis component;

processing means comprising means for producing a reference signal that is operative to define one or more first time periods during which the Coriolis components have one polarity and one or more second time periods during which the Coriolis components have the opposite polarity, the first and second time periods together comprising one or more complete periods of the movement signal, means for determining, for each output signal, a first phase value representing the difference between the phase change of the output signal during the first time periods and the phase change of the output signal during the second time periods, and a second phase value representing the phase change of the output signal during the complete period of the movement signal, and means for determining from the phase values a first output value representing the angular rate of rotation of the body about the rate axis, and a second output value representing the linear acceleration of the body along the sensing axis.

* * * * *